Figure 1:
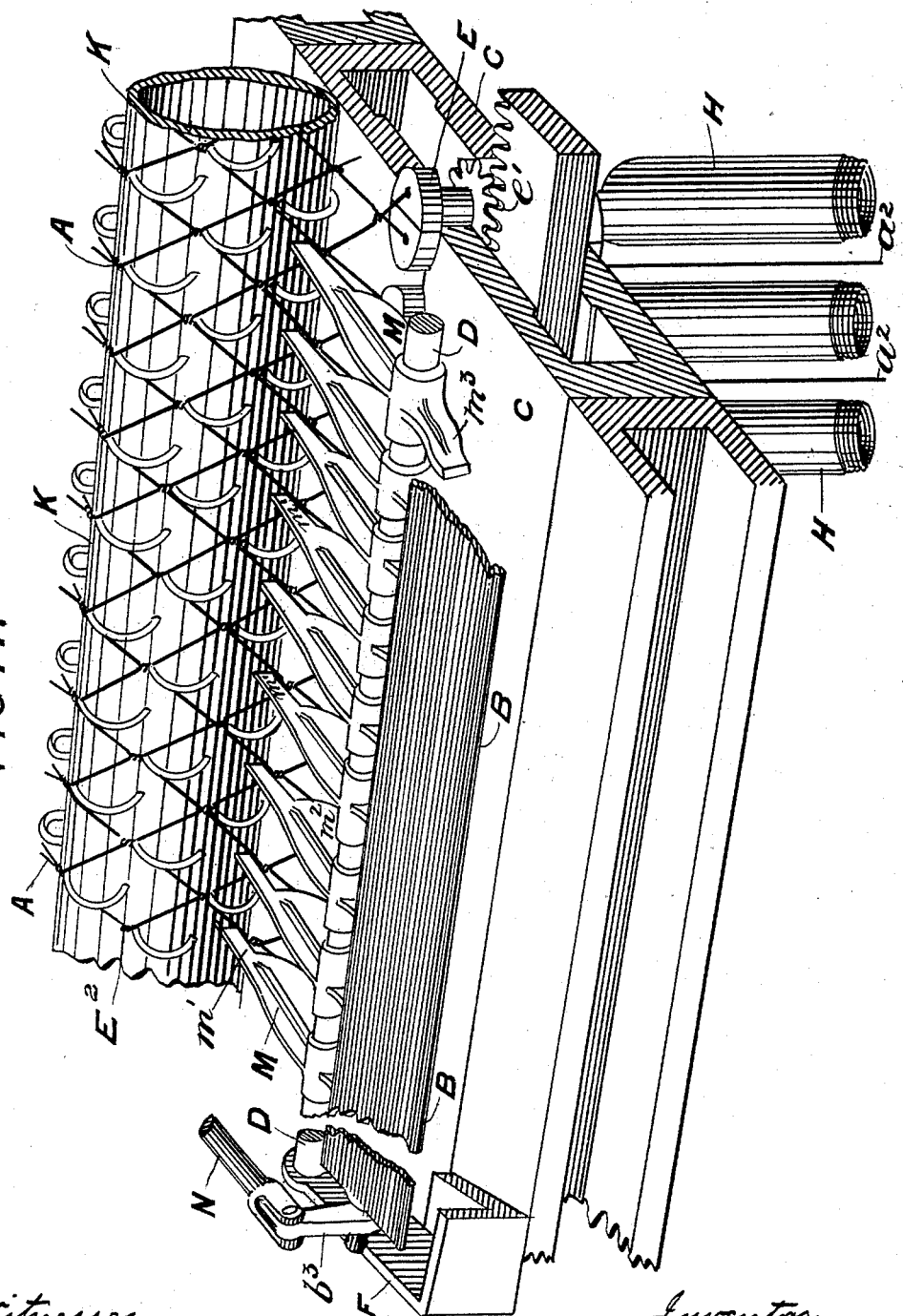

(No Model.) 5 Sheets—Sheet 1.

E. S. BOND.
DETECTOR STOP MOTION FOR WIRE NETTING MACHINES.

No. 484,992. Patented Oct. 25, 1892.

(No Model.) 5 Sheets—Sheet 2.
E. S. BOND.
DETECTOR STOP MOTION FOR WIRE NETTING MACHINES.
No. 484,992. Patented Oct. 25, 1892.
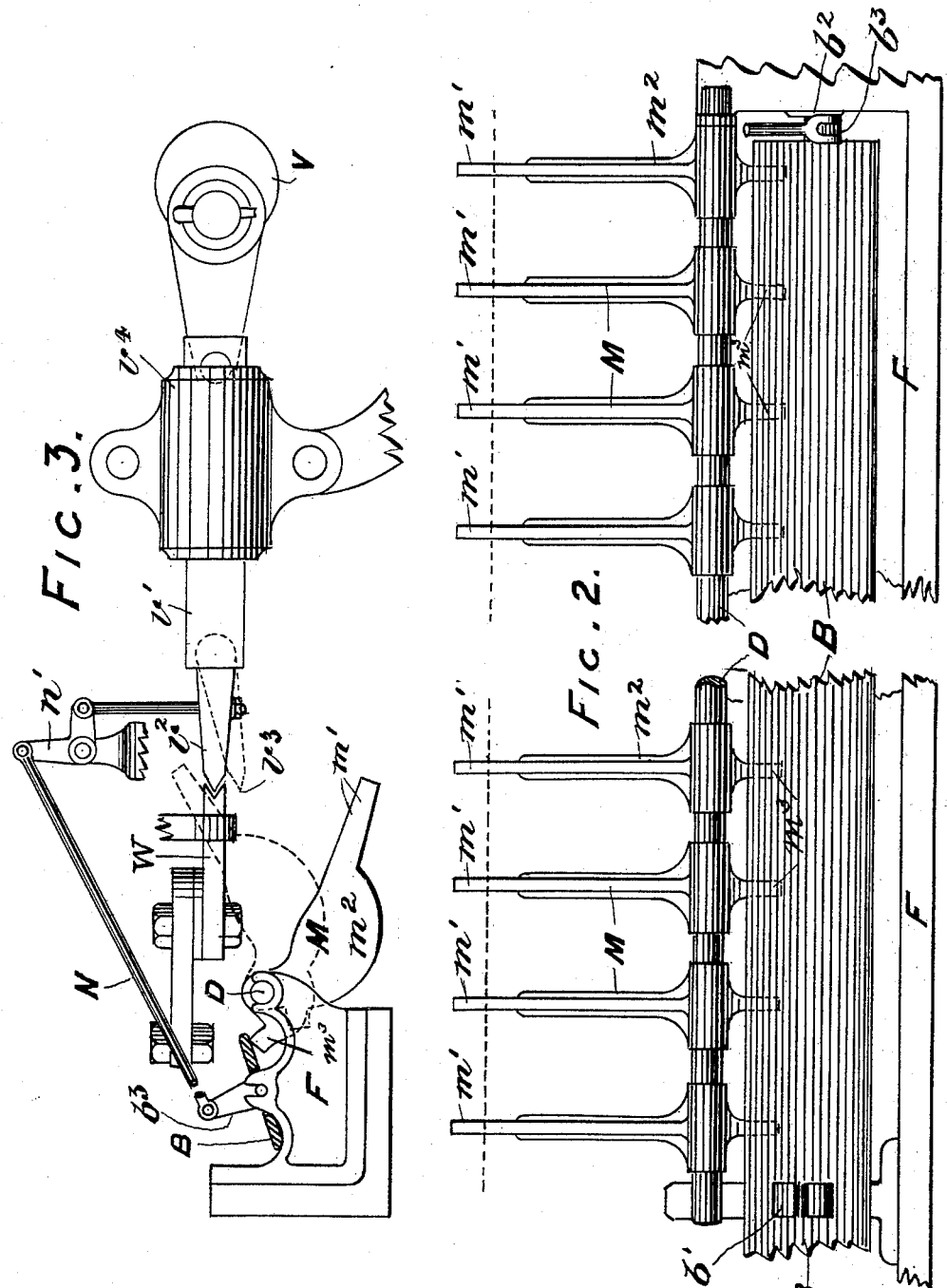

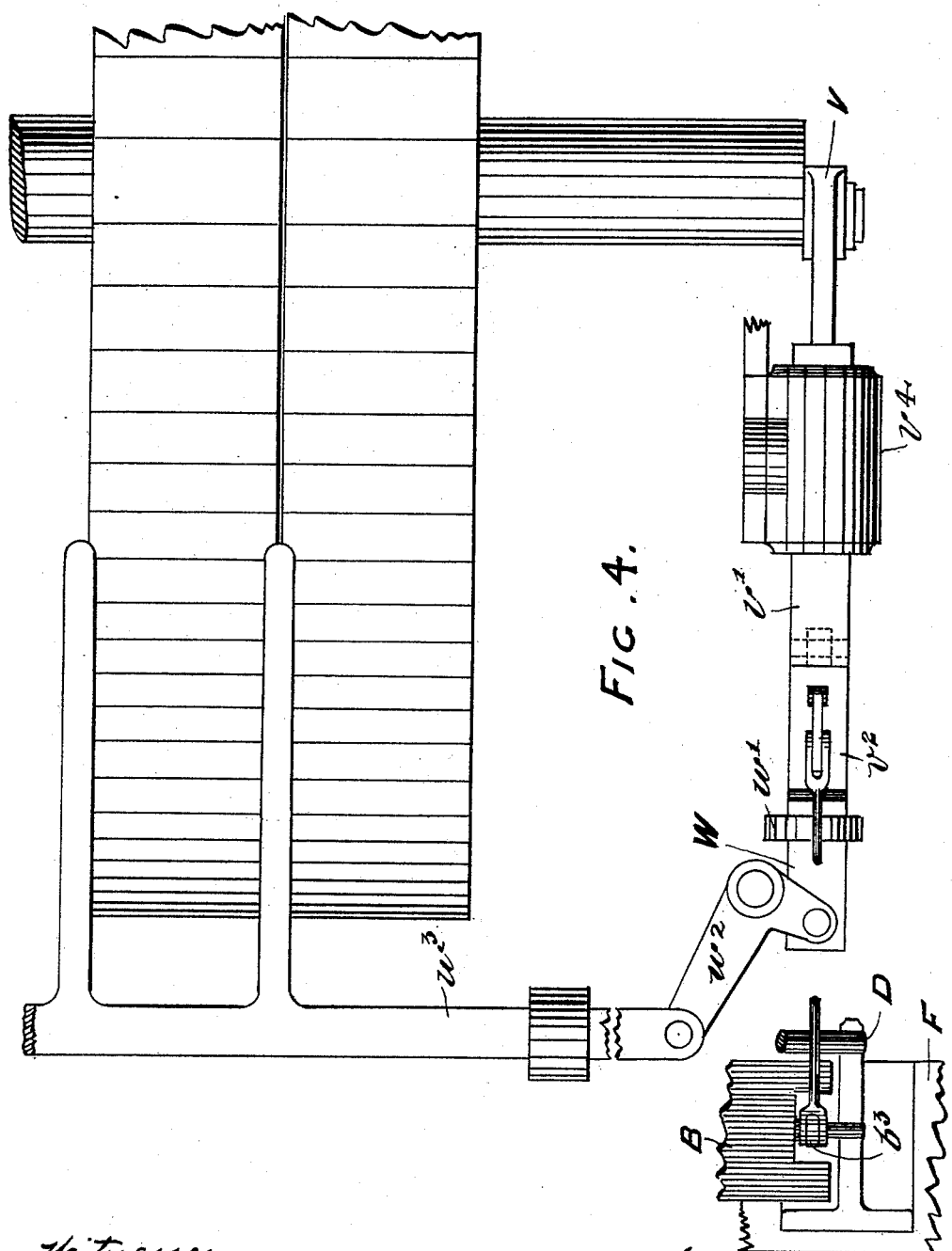

(No Model.)  5 Sheets—Sheet 4.
E. S. BOND.
DETECTOR STOP MOTION FOR WIRE NETTING MACHINES.
No. 484,992. Patented Oct. 25, 1892.
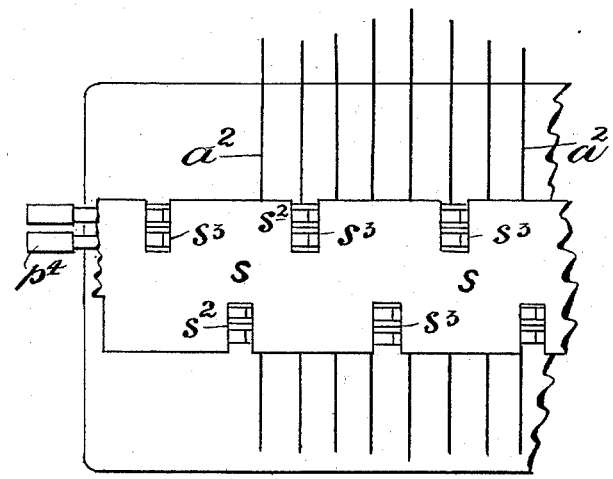
FIG. 6.
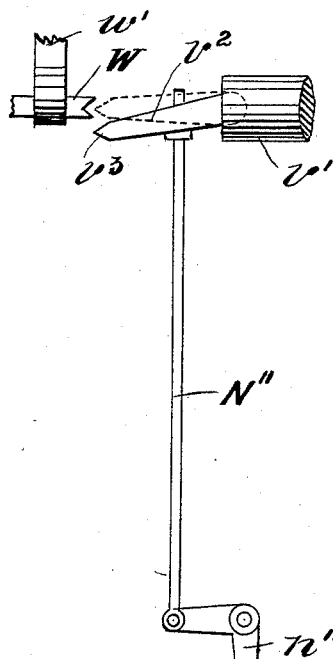
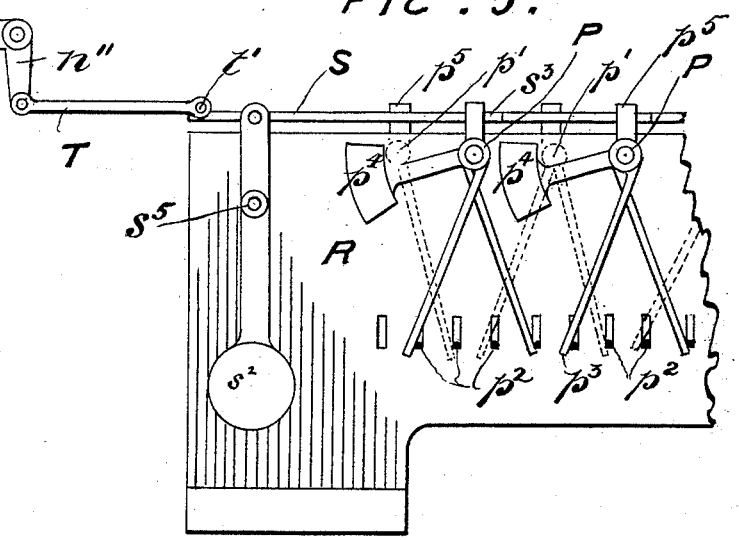
FIG. 5.
Witnesses
W. Harvey Muzzy.
E. J. Hersen.
Inventor
Edward Samuel Bond
By Wm H Babcock
Atty.

(No Model.) 5 Sheets—Sheet 5.
E. S. BOND.
DETECTOR STOP MOTION FOR WIRE NETTING MACHINES.
No. 484,992. Patented Oct. 25, 1892.

Witnesses
W. Harvey Muzzy
E. Jenssen

Inventor
Edward Samuel Bond
By Wm H Babcock Atty.

UNITED STATES PATENT OFFICE.

EDWARD SAMUEL BOND, OF BIRMINGHAM, ENGLAND.

DETECTOR STOP-MOTION FOR WIRE-NETTING MACHINES.

SPECIFICATION forming part of Letters Patent No. 484,992, dated October 25, 1892.

Application filed February 19, 1892. Serial No. 422,135. (No model.) Patented in England October 26, 1891, No. 18,380.

*To all whom it may concern:*

Be it known that I, EDWARD SAMUEL BOND, engineer and machinist, a subject of the Queen of Great Britain, residing at Crown Machine Works, Lower Hurst Street, Birmingham, in the county of Warwick, England, have invented a certain new and useful Improved Automatic Detector Stop-Motion for Wire-Netting and other Wire-Working Machines, (for which I have obtained Letters Patent in England, No. 18,380, dated October 26, 1891,) of which the following is a specification.

My invention has for its object a new or improved automatic detector stop-motion for wire-netting and other wire-working machines, by which a breakage or running-out of any one of the strands is immediately detected, however fast the machine may be running, while the machine is automatically and instantly stopped by the detecting arrangement and any gap in the mesh is thus prevented. In machines of this class it has hitherto been necessary to run them at a moderate speed to enable the attendant to detect any breakage of the wire; but with the addition of the following automatic detector stop-motion a machine may be run up to its greatest capacity without attention and without fear of the machine continuing to work with any one of the strands broken. I also apply a device to such machines so that upon a certain length of netting having been made the machine is automatically stopped, ready for the length to be severed from the machine prior to the commencement of another length.

In order that my invention may be clearly understood and more easily carried into practice, I have appended hereunto several sheets of drawings, upon which I have fully illustrated the nature of my said improvements applied to a similar wire-netting machine to those described and illustrated in my previous patent, No. 432,223, dated July 15, 1890, and my application, Serial No. 399,027, filed July 10, 1891, and from which its application to other wire-netting and other wire-working machines will be readily understood.

Figure 8:
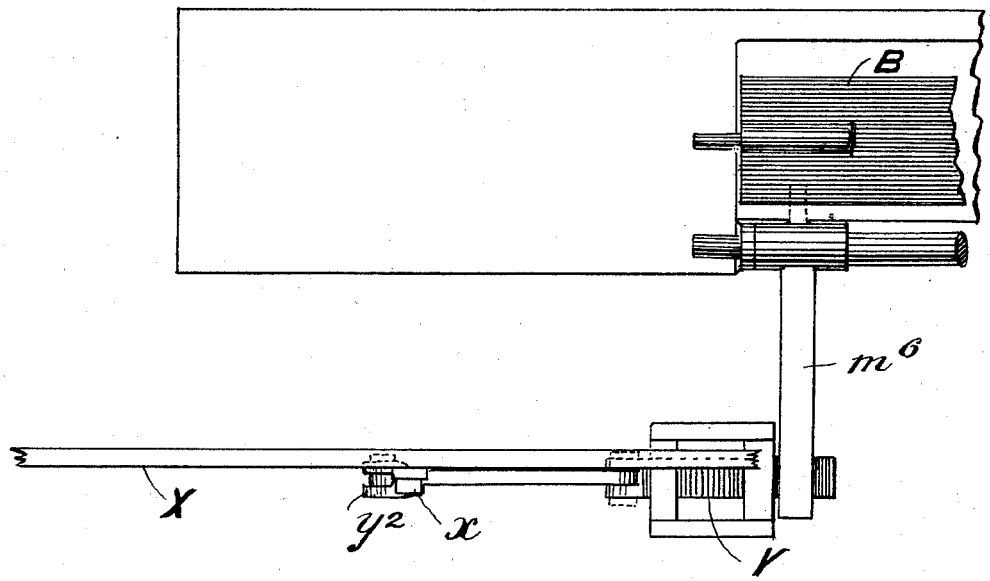
Figure 7:
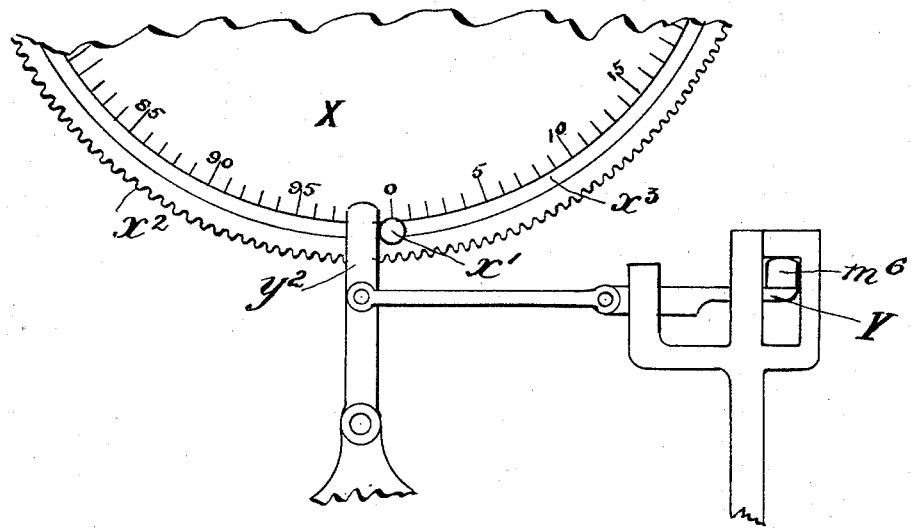

Figure 1 is a perspective view of the top part of a machine, showing my detector-motion applied to the netting. Fig. 2 is a broken-off plan of the dropper and detector-motion. Fig. 3 is an elevation of the stop-motion. Fig. 4 is a plan of Fig. 3, showing the application of the stop-motion to an ordinary fast and loose pulley. Fig. 5 is a broken-off elevation of the detector arrangement applied to the wires running from the bobbins at the bottom of the machine. Fig. 6 is a plan of Fig. 5. Fig. 7 is a partial elevation of the revolving-disk arrangement for automatically stopping the machine. Fig. 8 is a plan of Fig. 7.

I will proceed to describe my invention applied to an ordinary wire-netting machine, in which the wire A is twisted and the mesh formed by the operation of two rows of pinions E, which are revolved by the rack $e'$, one row above the other, in reciprocating plates C, one strand of the wire being drawn from a coil within the intermediate vertical tube H, the other strand $a^2$ being drawn from bobbins at the rear of the machine, the finished mesh A being drawn up vertically by the horizontal roller K.

In carrying my invention into effect the rod or shaft D is mounted in the brackets F, which are attached to any convenient part of the stationary part of the machine, being preferably situated at a level with the point at which the mesh A is formed by the twisting of the wire by the pinions E. Upon this rod or shaft D a series of levers or droppers M are mounted to turn, one dropper M being provided for each of the meshes or half-meshes $E^2$, and each of these levers is provided at the one end with the tail-piece $m'$, which is weighted at $m^2$, and having at the other end the nose-piece $m^3$ upon the other side of the pivot or bearing of the dropper. Running the whole length of the machine, the table B is pivoted at various points, as at $b'$, and runs along and above the whole of the nose-pieces $m^3$ of the levers, and to the pivot $b^2$ of this table the crank $b^3$ is attached to form a lever, which is operated by the turning of the table B and which in turn operates the stopping mechanism through the rod N, as will be afterward described.

The action of the above is then as follows: Each of the pivoted droppers M is placed with the tail-pieces M' in a horizontal position upon the first-twisted strand of the mesh above the top of the top pinions E, from which position they rise with the twisted strand until raised sufficiently high for the end of the dropper to clear, from which they fall upon the next meshes then being formed and rising underneath. So long as the strands of wire remain intact this action takes place without the nose end $m^3$ of the lever or dropper M actuating the pivoted table B, but immediately a breakage or running-out takes place in either of the strands the tail $m'$ of the lever falls through the gap thus made and raises the nose-piece $m^3$ sufficiently to tilt up the one side of the pivoted table B, and thereby actuate the lever $b^3$ and rod N. The droppers M may be modified in shape and used in combination with mechanism other than that of the tilting table B.

As the strands $a^2$ run horizontally from bobbins at the rear of the machine, an arrangement is provided whereby the breaking and running-out of such strands at that point should automatically stop the machine, and to effect this a number of crank-levers P are pivoted at $p'$ upon the supporting-plate R, through which the strands $a^2$ pass, the apertures $p^2$ being provided for the purpose. One end of each crank-lever P forms the vertical tail-piece $p^3$, the other end $p^4$ being horizontal and weighted, so as to press the vertical tail $p^3$ against the horizontal wire $a^2$. Above these crank-levers the rocking plate S is mounted and balanced by the suspending-weights $s^2$, which are hung at $s^5$, and from each crank-lever a stud or nose-piece $p^5$ rises vertically and enters a slot $s^3$, formed in the rocking plate S, each slot being provided with sufficient clearance, so that upon any one of the strands $a^2$ becoming broken the tail-piece $p^3$ of that respective strand is thereby released, which allows the weight $p^4$ to fall, thus causing the nose-piece or stud $p^5$ to rock the plate in the other direction sufficiently to operate the rod or lever T, which is hinged to the rocking plate at $t'$ and connected with the stopping mechanism of the machine by levers $N''$ and $n''$.

For operating the stopping mechanism of the machine by means of the movement of the pivoted table or rocking plate a crank or eccentric V is formed upon or attached to any convenient part of the driving-shaft of the machine, and to this crank or eccentric the ram $v'$ is attached, which has a reciprocating motion and slides in the bearing $v^4$, which is attached to any suitable part of the main frame of the machine, and in a line and level with this ram the sliding buffer W is mounted in the bearing $w'$ and is connected with one end of the pivoted crank-lever $w^2$, the other end of which is attached to the rod $w^3$, upon which the belt-shifting fork is mounted, and between the buffer W and ram $v'$ the tumbler or dropper $v^2$ is mounted. The normal position when the machine is properly at work is shown by dotted lines in Fig. 3, with its point $v^3$ clear of the buffer during its reciprocating motion; but this tumbler $v^2$ being connected by the crank-lever $n'$ and rod N with the lever $b^3$ upon the pivoted table and with the rod T upon the rocking table the movement of the table B or S in either case brings the tumbler $v^2$ into a line with the buffer W, by which the first thrust caused by the eccentric V operates the buffer, and through it throws off the band from the fast to the loose pulley, whereby the machine is instantly stopped. For automatically stopping the machine after any required length of the netting has been made I use in conjunction with the droppers M and pivoted table B a revolving disk or dial X, the bearing of which is mounted upon any convenient part of the framework of the machine, and this disk or dial X is geared down in speed from the roller K, which draws up the netting by a worm-gearing into the teeth $x^2$ and has upon its face the stud $x'$, which is made to be adjustable in the groove $x^3$ in its position, so that it may as it rotates catch against the pivoted lever $y^2$, withdraw the reciprocating plunger Y from under the extra dropper $m^6$, which actuates the pivoted table B and in turn operates the dropper or tumbler $v^2$, as before described, and thus the machine is stopped. Before starting the machine again the parts are replaced in their former positions by hand.

It will be obvious that my improvements can be equally applied to any class of machine-stopping attachments, whether friction-clutch or otherwise, and further that the details and the arrangement of the parts may be varied to suit the great variety of machines to which the improvement is applicable.

What I claim then is—

1. In a break-detector for wire-netting machines, the combination, with pivoted droppers engaging the wire, of a rocking table arranged to be actuated by said droppers and a series of levers operated by said table to stop the machine, substantially as set forth.

2. In a break-detector for wire-netting machines, the combination, with levers P, arranged to engage the wires, of a sliding table operated by said levers and belt-shifting devices actuated by said table to stop the machine, substantially as set forth.

3. In a break-detector for wire-netting machines, the combination, with pivoted levers engaging the wire, of a reciprocating ram having a pivoted tumbler mounted thereon, connecting devices between said levers and said tumbler, whereby the latter is raised and lowered, and belt-shifting devices which are operated by said levers, substantially as set forth.

4. In a break-detector for wire-netting machines, the combination, with pivoted levers arranged to engage and actuate a rocking table, of such table and levers connected thereto for stopping the machine, an auxiliary pivoted lever supported by a sliding arm, a lever pivoted to said arm for actuating it, and a rotary disk provided with a projecting stud adjustably mounted thereon, all substantially as set forth.

5. In a break-detector for wire-netting machines, the combination, with pivoted levers arranged to engage the wire, of a reciprocating table actuated by said levers, a cam-actuated ram, a pivoted tumbler attached to said ram, a buffer arranged to be struck by said tumbler, a belt-shifting device, and levers connecting said device with said buffer, substantially as set forth.

In testimony that I claim the foregoing as my own I affix my name in the presence of two witnesses.

EDWARD SAMUEL BOND.

Witnesses:
LEWIS WM. SOOLD,
GEORGE LESTER.